United States Patent [19]
Morita et al.

[11] Patent Number: 6,039,816
[45] Date of Patent: Mar. 21, 2000

[54] OZONIZER, WATER PURIFIER AND METHOD OF CLEANING AN OZONIZER

[75] Inventors: Naotoshi Morita, Gifu; Sachio Wakita, Aichi, both of Japan

[73] Assignee: NGK Spark Plug Co., Ltd., Nagoya, Japan

[21] Appl. No.: 09/085,102

[22] Filed: May 28, 1998

[30] Foreign Application Priority Data

Jun. 12, 1997 [JP] Japan ...................................... 9-171137
Nov. 4, 1997 [JP] Japan ...................................... 9-318987

[51] Int. Cl.$^7$ .............................. B08B 7/02; B01J 19/08
[52] U.S. Cl. ........................... 134/19; 210/192; 210/760; 422/186.07; 422/186.2
[58] Field of Search ...................... 134/1, 19; 156/89.19; 250/324; 210/138, 149, 175, 192, 243, 259, 748, 742, 760, 774, 806; 422/7, 28, 186.07, 186.15, 186.19, 186.2, 22, 24, 186.3

[56] References Cited

U.S. PATENT DOCUMENTS

| | | |
|---|---|---|
| 3,421,999 | 1/1969 | Corwin . |
| 3,457,159 | 7/1969 | Fortier . |
| 3,745,750 | 7/1973 | Arff ..................................... 422/186.15 |
| 4,652,318 | 3/1987 | Masuda et al. .......................... 250/324 |
| 4,988,484 | 1/1991 | Karlson ................................ 422/186.2 |
| 5,326,539 | 7/1994 | Taylor ................................. 422/186.07 |
| 5,542,967 | 8/1996 | Ponizovsky et al. .............. 422/186.15 |
| 5,733,512 | 3/1998 | Tsai et al. ............................. 422/186.2 |
| 5,824,274 | 10/1998 | Long ................................... 422/186.07 |

*Primary Examiner*—Joseph W. Drodge
*Attorney, Agent, or Firm*—Sughrue, Mion, Zinn Macpeak & Seas, PLLC

[57] ABSTRACT

An ozonizer and water purifier equipped with the ozonizer comprising an ozonizing discharge element; an electric circuit for applying a voltage to the ozonizing discharge element so as to produce an ozone-generating discharge; a housing having an opening formed therein for receiving the ozonizing discharge element; a cover which seals the ozonizing discharge element in the housing; and a device for turning off the voltage applied to the ozonizing discharge element when the cover is removed. In another embodiment, at least a part of the cover or housing is transparent so as to enable detection of the discharge state of the ozonizing discharge element. Also included is an ozonizer and a water purifier comprising the ozonizer which includes a discharge element for generating ozone by discharge, wherein ammonium nitrate and other substances adhere to the discharge element upon discharge; and a heat generating element for heating the discharge element to a predetermined temperature which induces scattering of at least ammonium nitrate molecules among those substances adhering to the discharge element. Also included is a method of cleaning an ozonizer having a discharge element for generating ozone by discharge wherein ammonium nitrate and other substances adhere to the discharge element upon discharge, which includes heating the discharge element to a predetermined temperature so as to evaporate at least ammonium nitrate among those substances adhering to the discharge element.

13 Claims, 13 Drawing Sheets

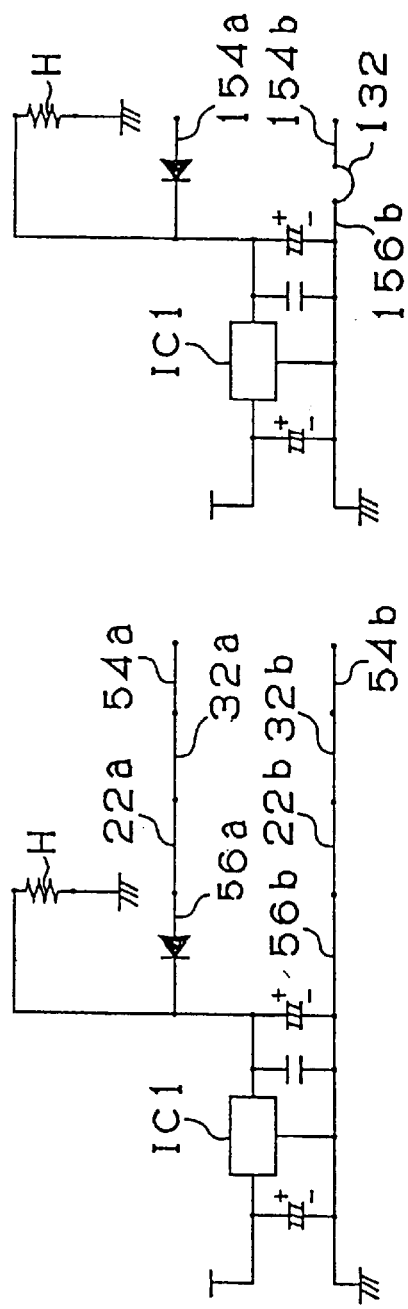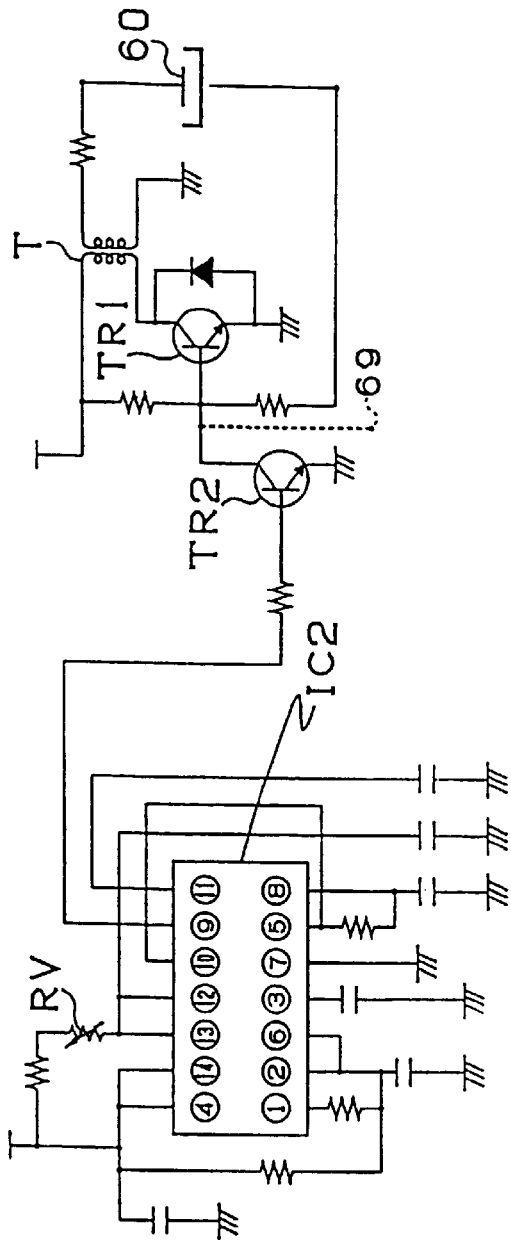

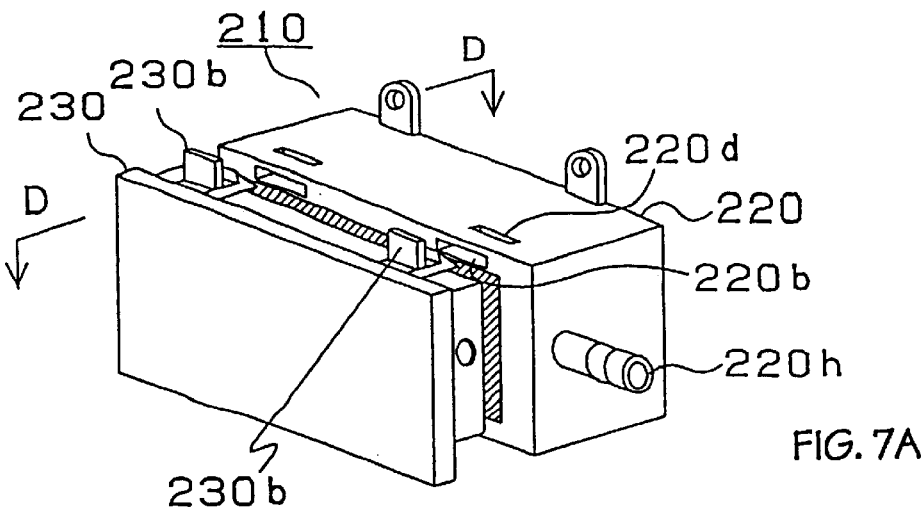
FIG. 7A
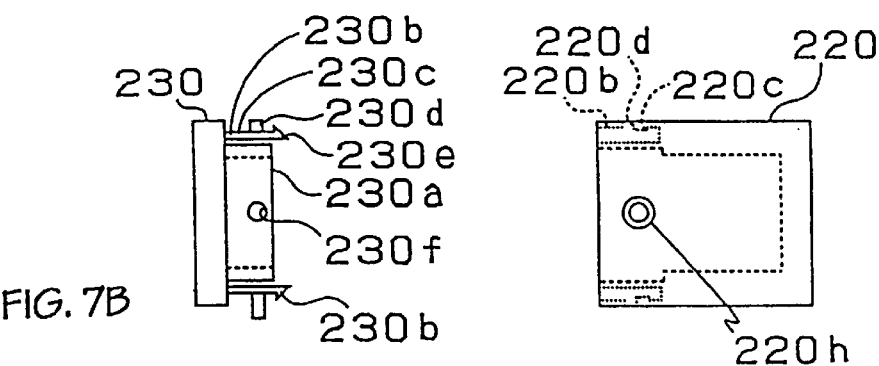
FIG. 7B
FIG. 7C
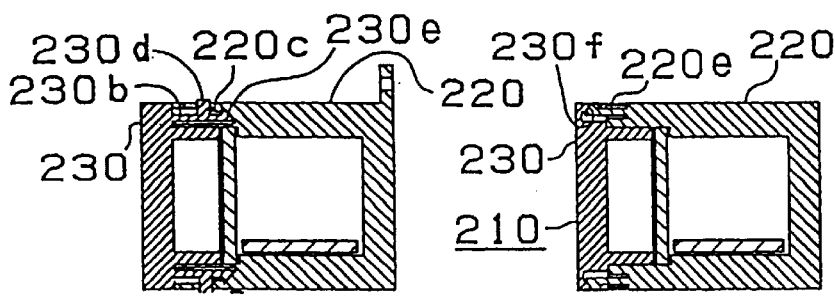
FIG. 7D
FIG. 7E

OZONIZER, WATER PURIFIER AND METHOD OF CLEANING AN OZONIZER

BACKGROUND OF THE INVENTION

1. Field of the Invention

The present invention relates to an ozonizer for generating ozone from the oxygen contained in air, and more particularly, to an ozonizer well adapted for use in 24-hour working baths, circulating water purifiers such as a Jacuzzi, ozonized water generators, water purifiers and the like. Furthermore, the present invention relates to a water purifier equipped with an ozonizer for use with 24-hour working baths, Jacuzzis, ponds, water tanks and pools, and to a method of cleaning the ozonizer.

2. Description of the Related Art

Ozone has conventionally been used in industrial as well as household applications for purifying and deodorizing water and the like. A relatively small-sized apparatus for generating ozone for household use employs a creeping discharge element including a filamentary discharge electrode and a surface induction electrode disposed opposite each other and a dielectric layer interposed therebetween. A voltage is applied between the electrodes to thereby excite discharge on the filamentary discharge electrode. This type of creeping discharge element is disclosed, for example, in U.S. Pat. No. 4,652,318.

More particularly, such ozonizers include a creeping discharge element, a power circuit and a resin case for housing the creeping discharge element and power circuit. The creeping discharge element is typically composed of a dielectric layer formed from ceramic, a filamentary discharge electrode disposed on one surface of the dielectric layer, and a surface induction layer disposed on the other surface of the dielectric layer opposite the filamentary discharge electrode. The power circuit applies a voltage between the filamentary discharge electrode and surface induction electrode so as to excite a discharge from the filamentary discharge electrode.

In Japanese Patent Application Laid-Open (kokai) No. 8-171979, the present applicant proposed an ozonizer employing a creeping discharge element for use in the circulating water purifier of a 24-hour working bath. This ozonizer is described below with reference to FIGS. 8A–8D. FIG. 8B shows a plan view of the ozonizer 310. FIG. 8A shows a plan view of a cover 330 that attaches to the ozonizer. FIG. 8C shows the ozonizer of FIG. 8B as viewed in the direction of arrow C of FIG. 8B. FIG. 8D shows a sectional view along line 8D—8D of FIG. 8B.

As shown in FIG. 8D, a creeping discharge element, i.e. an ozonizing element, is formed as part of a high-voltage generating board 350 including a high-voltage-generating circuit element 352. Specifically, the high-voltage generating board 350 is formed from a dielectric having a surface induction electrode 366 embedded in a portion thereof and a filamentary discharge electrode 368 disposed on the top surface thereof. The high-voltage generating board 350 is disposed within a housing 320 such that the filamentary discharge electrode 368 mounted on the high-voltage generating board 350 faces an opening 320a formed in the housing 320. The cover shown in FIG. 8A is attached to the housing 320 so as to close the opening 320a, to thereby prevent ozone leakage from the housing 320.

Large-sized creeping discharge type ozonizers for industrial use employ pure oxygen or dry air as a starting material, whereas small-sized ozonizers for household use employing the above-described creeping discharge element use untreated air as a starting material. Accordingly, small-sized ozonizers are disadvantageous in that when the creeping discharge element is used continuously, the material of the creeping discharge element reacts with nitrogen or the like in air to form an ammonium salt on the element surface. The ammonium salt hinders creeping discharge with a resulting failure in the proper generation of ozone. Thus, for such small-sized creeping discharge type ozonizers, it is important to check whether ozone continues to be generated. Hitherto, this checking was difficult to conduct.

More particularly, because untreated air has a humidity higher than that of artificially-produced dry air, large amounts of nitrogen oxides are produced when ozone is generated by discharge.

The nitrogen oxides chemically react with ammonia present in the air to produce ammonium nitrate. The thus-produced ammonium nitrate covers the filamentary discharge electrode.

Accordingly, the density of the electric field generated by the filamentary discharge electrode is reduced. Also, ammonium nitrate covering the filamentary discharge electrode absorbs water present in the air and becomes electrically conductive, thus increasing the apparent area of the filamentary discharge electrode. As a result, the capacitance of the dielectric increases.

That is, in a conventional ozonizer, because ammonium nitrate covers the filamentary discharge electrode, the density of the electric field generated by the filamentary discharge electrode is reduced. The capacitance of the dielectric increases, resulting in reduced ozone generation.

Conventionally, therefore, the ozonizer is disassembled, and adhering ammonium nitrate is wiped off from the filamentary discharge electrode using water or a solvent. That is, a conventional ozonizer must be maintained through manual labor.

After cleaning, the creeping discharge element resumes discharging to thereby generate ozone. However, a high electric potential of several kilovolts is applied to the creeping discharge element even though the current flowing through the element is very small. Therefore, it is dangerous for an ordinary household user to clean the element. That is, even though designed for household use, conventional ozonizers are difficult to maintain.

SUMMARY OF THE INVENTION

It is therefore an object of the present invention to provide an ozonizer which is easy to maintain and a water purifier equipped with the ozonizer.

Yet another object of the present invention is to provide an ozonizer, a water purifier and a method of cleaning the ozonizer which allows for easy removal of at least ammonium nitrate among those substances adhering to a discharge element without the need for manual cleaning and which dispenses with the need for touching the discharge element.

The above objects have been achieved according to a first aspect of the present invention by providing an ozonizer which comprises an ozonizing discharge element, an electric circuit for applying a voltage to said ozonizing discharge element so as to produce an ozone-generating discharge; a housing having an opening formed therein for receiving said ozonizing discharge element, a cover which seals the ozonizing discharge element in said housing, and means for turning off the voltage applied to said ozonizing discharge element when the cover is removed.

In the ozonizer according to the above first aspect of the present invention, it is safe to clean the ozonizing discharge element because the voltage applied to the ozonizing discharge element is turned off when the cover is removed.

In the ozonizer, preferably at least part of the cover or housing is transparent so as to enable visual detection of the discharge state of the ozonizing discharge element. Instead of visual inspection, for example, a light sensor which detects a discharge light of the ozonizing discharge element through the transparent cover or housing may be placed outside the transparent cover or housing to confirm the discharge state of the ozonizing discharge element. Thus, the ozonizer is easy to maintain.

According to a second aspect, the present invention provides an ozonizer which comprises an ozonizing discharging element, an electric circuit for applying a voltage to said ozonizing discharge element so as to produce an ozone-generating discharge, a housing having an opening formed therein for receiving said ozonizing discharge element, and a cover which seals the ozonizing discharge element in said housing, wherein at least part of said cover or housing is transparent so as to enable visual detection of the discharge state of the ozonizing discharge element.

In the ozonizer according to the above second aspect of the present invention, the discharge state of the ozonizing discharge element can be visually observed or easily detected with a sensor.

Also, in the above-described ozonizers, an ozone discharge pipe is preferably provided on said housing separate from said cover.

Namely, because a piping portion is provided on the housing side, the piping portion, to which an ozone pipe is connected, remains stationary when the cover is removed. Accordingly, protection is provided against accidentally disconnecting the ozone pipe from the piping portion, to thereby prevent a gas leak which might otherwise result and assure safe operation.

In the above-described ozonizers, each of the housing and the cover preferably comprises engagement means for fixedly engaging one another. More preferably, one of the engagement means comprises a hook portion and the other comprises an engagement portion for engaging the hook portion.

In this case, because the housing and the cover are fixed together via the engagement means, the cover is easily detached from or attached to the housing by disengaging or engaging the engagement means.

According to a third aspect, the present invention provides a water purifier equipped with an ozonizer which comprises an ozonizing discharge element, an electric circuit for applying a voltage to said ozonizing discharge element so as to produce an ozone-generating discharge; a housing having an opening formed therein for receiving the ozonizing discharge element, and a cover which seals said ozonizing discharge element in said housing, wherein at least part of the cover or housing is transparent so as to enable visual detection of the discharge state of the ozonizing discharge element.

In the water purifier according to the above third aspect of the present invention, the discharge state of the ozonizing discharge element can be visually observed with ease because at least a part of the cover or housing is transparent. Thus, the water purifier is easy to maintain.

The water purifier preferably includes a window through which the transparent portion of the cover of the ozonizer can be visually observed from the outside. Thus, it is easy to visually observe the discharge state of the ozonizing discharge element.

According to a fourth aspect, the present invention provides a water purifier equipped with an ozonizer which comprises an ozonizing discharge element, a power unit for energizing and applying a voltage to said ozonizing discharge element so as to produce an ozone-generating discharge, a housing having an opening formed therein for receiving said ozonizing discharge element, a cover which seals said ozonizing discharge element in said housing, and means for turning off the voltage applied to the ozonizing discharge element when the cover is removed.

In the water purifier according to the above fourth aspect of the present invention, it is safe to clean the ozonizing discharge element because the voltage applied to the ozonizing discharge element is turned off when the cover is removed.

Furthermore, in the above first through fourth aspects of the present invention, the cover preferably hermetically seals the ozonizing discharge element in the housing.

According to a fifth aspect, the present invention provides an improved ozonizer having a discharge element for generating ozone by electric discharge. The ozonizer includes a heat generating element for generating heat upon input of current so as to heat the discharge element. The ozonizer also includes a heat generating circuit for supplying current to the heat generating element so as to heat the heat generating element and thereby heat the discharge element to a predetermined temperature. This induces scattering of at least ammonium nitrate molecules among those substances adhering to the discharge element.

In the ozonizer according to the above fifth aspect of the present invention, the discharge element preferably includes a dielectric formed from ceramic, a discharge electrode disposed on one surface of the dielectric, and an induction electrode disposed in the dielectric opposed to and separate from the discharge electrode. The heat generating element is preferably disposed on the other surface of the dielectric opposed to the induction electrode.

Because ammonium nitrate adhering to the discharge element can be evaporated by operating the heat generating circuit, the user does not have to touch or handle the discharge element to clean the same. In contrast, in a conventional cleaning practice, the user wipes off adhering ammonium nitrate from a discharge element using water or a solvent.

In the ozonizer according to the above fifth aspect of the present invention, the discharge element is heated preferably to a set temperature within a range of from 200° C. to 500° C., more preferably, within a range of from 250° C. to 350° C. A broad temperature range of from 200° C. to 500° C. is employed because ammonium nitrate adhering to the discharge element can be evaporated at a temperature within this range. Ammonium nitrate adhering to the discharge element begins to evaporate at a temperature slightly above 200° C. However, in order to reduce the evaporation time, the discharge element is preferably heated to a temperature of at least 250° C. Also, if the discharge element is heated to an excessively high temperature, the resin case which houses the discharge element may become deformed. Therefore, a temperature range of from 250° C. to 350° C. is more preferred.

In the ozonizer according to the above fifth aspect of the present invention, a heat generating time control means is preferably provided in order to control the period of time during which the heat generating element generates heat.

In this manner, the heating time for heating the discharge element can be controlled. That is, the discharge element can be maintained at the set temperature under control of the heat generating time control means.

The heat generating time control means preferably comprises a thermistor having a positive characteristic connected in series with the heat generating element.

Because the thermistor having a positive characteristic increases in resistance with an increase in temperature, the thermistor connected to the heat generating element shuts off current flow to the heat generating element after a predetermined time has elapsed, to thereby prevent overheating of the discharge element.

Also, the use of the thermistor reduces the cost of the ozonizer as compared with the case where a complicated timer circuit is employed.

The ozonizer according to the above fifth aspect of the present invention preferably comprises a discharge element housed in a resin case. The induction electrode is connected to a high-voltage supply, and the discharge electrode is connected to ground. A portion of the discharge electrode is covered with a protective film against wear caused by discharge, and the uncovered portion of the discharge electrode is exposed from one surface of the dielectric.

In this structure, the induction electrode is connected to a high-voltage supply, and the discharge electrode is connected to ground. Therefore, even when water enters the case and wets the discharge electrode, the electric potential between the electrodes is rendered identical to that of the water. Accordingly, one would not suffer electric shock by touching the ozonizer.

Furthermore, the discharge electrode excluding a certain portion thereof is covered with a protective film against wear caused by discharge, and the uncovered portion is exposed from one surface of the dielectric. Accordingly, even if the dielectric breaks with the resulting exposure of a high-voltage portion (for example, a portion of the induction electrode or heat generating element), current flows into the exposed portion of the discharge electrode such that electric shock is prevented.

The discharge element is preferably housed in a case with a heat resistant rubber gasket interposed therebetween. This prevents heat generated by the discharge element from being transmitted to the resin case which might otherwise cause the resin case to deteriorate or deform.

In the ozonizer according to the above fifth aspect of the present invention, a timer is preferably provided in order to control the period of time during which electrical power is supplied to the discharge element and the heat generating circuit.

According to a sixth aspect, the present invention provides a water purifier which includes the above described ozonizer, a filter for filtering water, and ozone discharging means for discharging ozone generated by the ozonizer into water filtered through the filter.

When a water purifier equipped with an ozonizer is disassembled and maintained, water entering into the ozonizer may cause electric shock. By contrast, in the case of a water purifier equipped with the ozonizer according to the present invention, the ozonizer can be maintained merely by operating the heat generating circuit with no need of disassembly. Thus, maintaining the ozonizer does not involve the risk of electric shock.

According to a seventh aspect, the present invention provides a method of cleaning an ozonizer having a discharge element for generating ozone by electric discharge. In this method, the discharge element is heated to a predetermined temperature using a heat generating element and a heat generating circuit for supplying current to the heat generating element so as to heat the heat generating element, to thereby evaporate at least ammonium nitrate among those substances adhering to the discharge element.

Because the cleaning method of the present invention allows a user to evaporate ammonium nitrate adhering to the discharge element by operating the heat generating circuit, the invention dispenses with the need for handling the discharge element in order to clean the same. In contrast, in a conventional cleaning practice, the user wipes off adhering ammonium nitrate from a discharge element using water or a solvent.

BRIEF DESCRIPTION OF THE DRAWINGS

Various other objects, features and attendant advantages of the present invention will be understood by reference to the following detailed description of the preferred embodiments when considered with the accompanying drawings, in which:

FIGS. 4A and 4B are circuit diagrams of the high-voltage generating board of the ozonizer according to the first embodiment;

FIG. 4C is a circuit diagram of the high-voltage generating board of an ozonizer according to a second embodiment of the present invention;

FIG. 7A is a perspective view of an ozonizer according to a third embodiment of the present invention;

FIG. 7B is a side view of the cover of the ozonizer of FIG. 7A;

FIG. 7C is a side view of the housing of the ozonizer of FIG. 7A;

FIG. 7D is a sectional view along line 7D—7D of FIG. 7A;

FIG. 7E is a sectional view of an ozonizer according to a modification of the third embodiment;

DESCRIPTION OF THE PREFERRED EMBODIMENTS

The present invention will be described in greater detail below with reference to the drawings.

Figure 1:
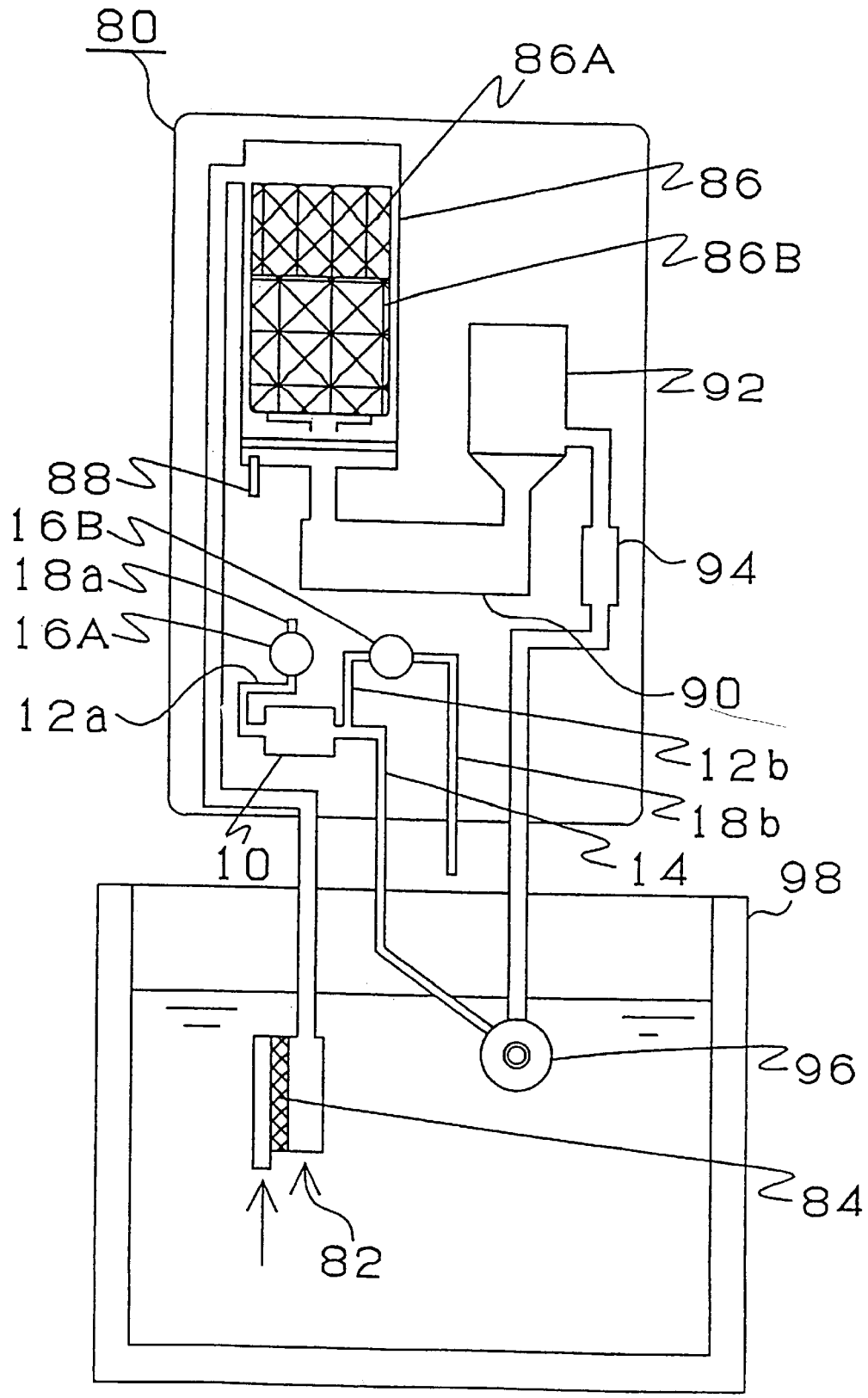
FIG. 1 is a schematic view showing the structure of a circulating water purifier according to a first embodiment of the present invention.

FIG. 1 shows the structure of a circulating water purifier 80 for use in a 24-hour working-type Jacuzzi (whirlpool bath) according to a first embodiment of the present invention.

Hot water in a bathtub 98 is drawn in through a water intake unit 82, and debris such as hair is filtered from the hot water by a filter 84 disposed within the water intake unit 82. Bucket 86 purifies the filtered hot water drawn in through the water intake unit 82. The bucket 86 contains activated carbon 86B and porous natural stone 86A containing silicon dioxide ($SiO_2$) as a main component, and a temperature sensor 88 is disposed at the bottom of the bucket 86. Microorganisms adhering to the natural stone 86A and activated carbon 86B act as a biofilter to decompose impurities contained in the hot water. The temperature of the hot water leaving the bucket 86 is monitored by the temperature sensor 88, and the hot water is heated to an appropriate bathing temperature of 42° C. to 44° C. by a heater 90 equipped with a ceramic heater (not shown). Hot water heated by the heater 90 is pumped by a circulation pump 92 and discharged into the bathtub 98 from a jet nozzle 96 via a water flow sensor 94. The water flow sensor 94 monitors water flow from the circulation pump 92 and turns off the circulation pump 92 when needed to protect its built-in motor. This occurs, for example, when the filter 84 is clogged and hot water in the bathtub 98 is not being pumped to the circulation pump 92.

The circulating water purifier 80 contains an ozonizer 10 for generating ozone from oxygen contained in air. A first solenoid valve 16A is mounted on a first air intake pipe 12a used for drawing air into the ozonizer 10. A pipe 18a open to the atmosphere at the tip end thereof is connected to the first solenoid valve 16A. A second air intake pipe 12b is connected to a discharge pipe 14 used for discharging ozone generated in the ozonizer 10 into the jet nozzle 96. A second solenoid valve 16B is mounted at the tip end of the second air intake pipe 12b. A pipe 18b open to the atmosphere at the tip end thereof is connected to the second solenoid valve 16B.

Under control of a controller (not shown), the ozonizer 10 is operated intermittently (for example, a 10-minute operation followed by a 50-minute pause). While the ozonizer 10 is operating, the first solenoid valve 16A is opened, and the second solenoid valve 16B is closed, so that air is taken into the ozonizer 10 through the first solenoid valve 16A to thereby generate ozone. The ozone thus generated is drawn into the jet nozzle 96 via the discharge pipe 14 and discharged into the hot water contained in the bathtub 98 in the form of bubbles. Thus, the ozone is introduced into the hot water. On the other hand, while operation of the ozonizer 10 is suspended, the first solenoid valve 16A is closed, and the second solenoid valve 16B is opened. As a result, air is taken in through the second solenoid valve 16B and drawn into the discharge pipe 14 via the second air intake pipe 12b. Then, air is discharged from the jet nozzle 96 into hot water contained in the bathtub 98 in the form of bubbles.

Next, an ozonizing element accommodated in the ozonizer 10 is described below with reference to FIGS. 2A–2C.

Figure 2A:
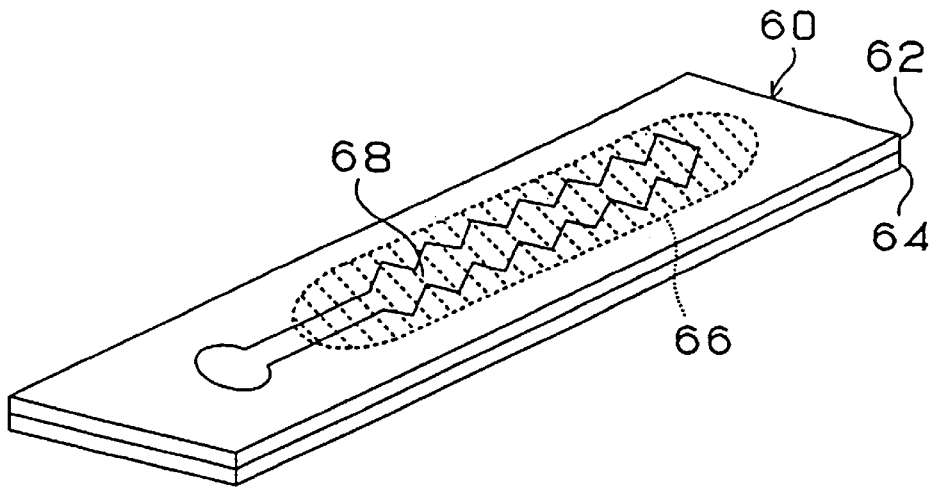
FIG. 2A is a perspective front-side view of an ozonizing element used in an ozonizer according to the first embodiment.
Figure 2B:
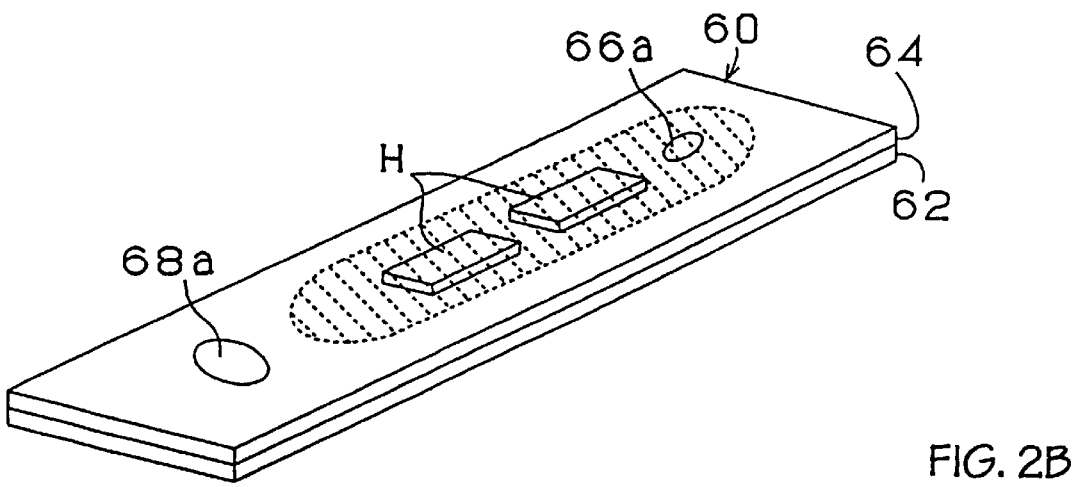
FIG. 2B is a perspective back-side view of the ozonizing element of FIG. 2A.

As shown in FIG. 2A, a creeping discharge type ozonizing element 60 includes a first dielectric layer 62 and a second dielectric layer 64, both formed from ceramic. A surface induction electrode 66 is interposed between the first dielectric layer 62 and the second dielectric layer 64. A filamentary discharge electrode 68 is disposed on the upper surface of the first dielectric layer 62. The surface of the filamentary discharge electrode 68 is covered with a glaze layer or ceramic layer (not shown) to prevent wear due to discharge. FIG. 2B shows the ozonizing element 60 of FIG. 2A viewed from underneath (back side). A terminal 66a connected to the surface induction electrode 66 and a terminal 68a connected to the filamentary discharge electrode 68 are exposed on the surface of the second induction layer 64. Also, heaters H are mounted on the surface of the second dielectric layer 64 to prevent dew condensation on the ozonizing element 60 which is described below. Power from a high-voltage generating board, which is also described below, is supplied to the electrodes 66 and 68 via the terminals 66a and 68a.

Figure 2C:
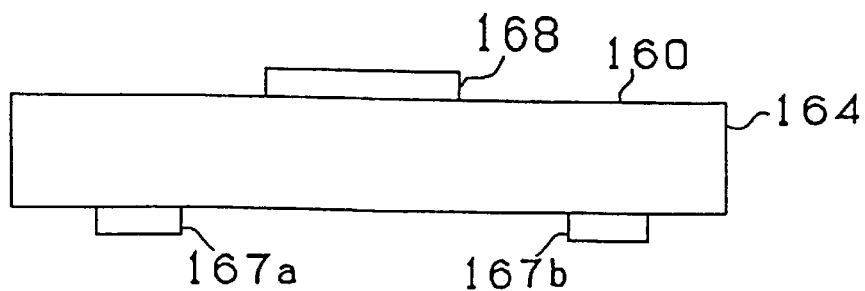
FIG. 2C is a side view of another type of ozonizing element according to another embodiment of the present invention.

FIG. 2C shows another type of ozonizing element 160 according to another embodiment of the present invention. In the creeping discharge type ozonization element 160, a filamentary discharge electrode 168 is disposed on the upper surface of a dielectric layer 164, and electrodes 167a and 167b for connection to a power supply are disposed on the lower surface of the dielectric layer 164.

Figure 3A:
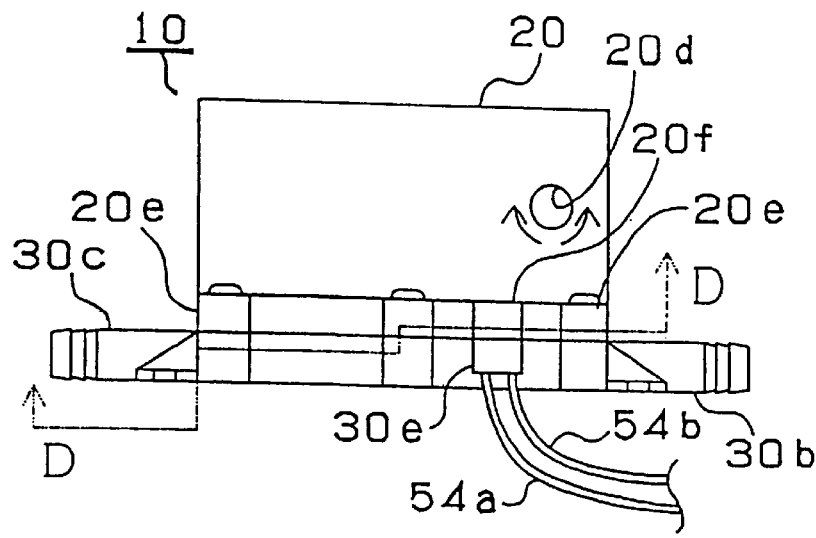
FIG. 3A is a front view of the ozonizer according to the first embodiment.
Figure 3B:
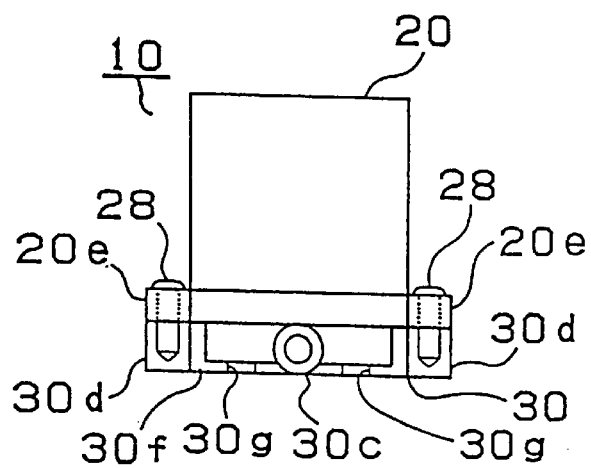
FIG. 3B is a side view of the ozonizer of FIG. 3A.
Figure 3C:
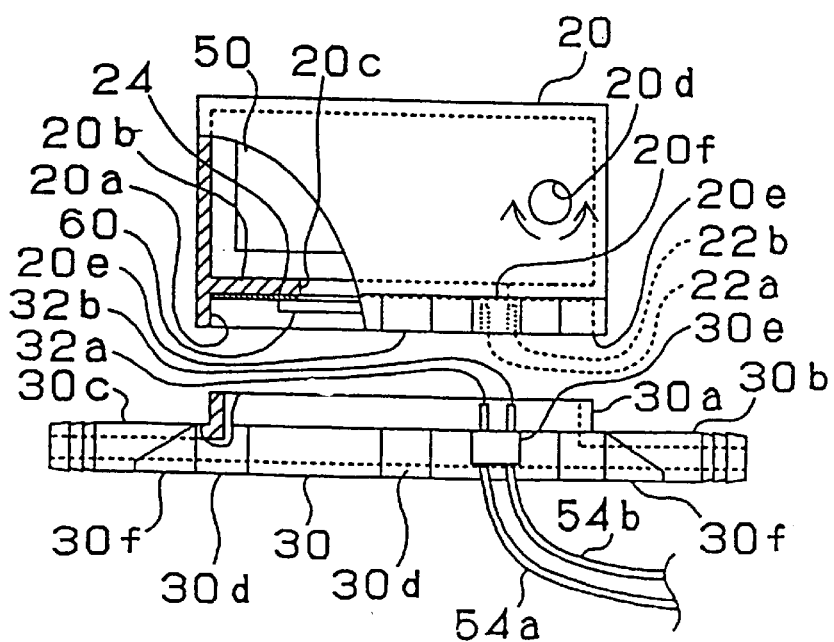
FIG. 3C is a view showing the ozonizer of FIG. 3A with its cover separated therefrom.
Figure 3D:
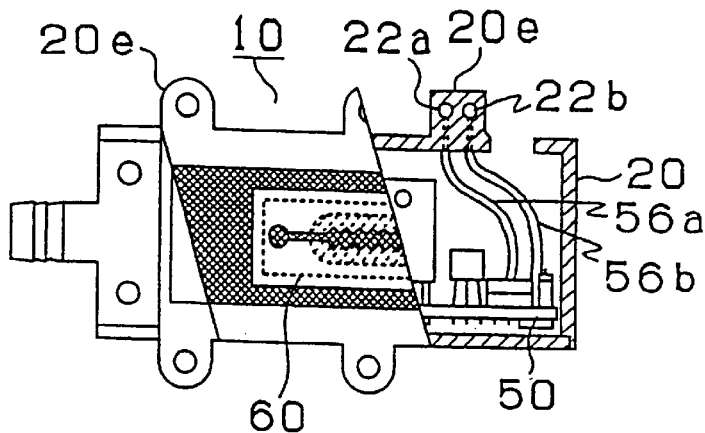
FIG. 3D is a sectional view along line 3D—3D of FIG. 3A.
Figure 3E:
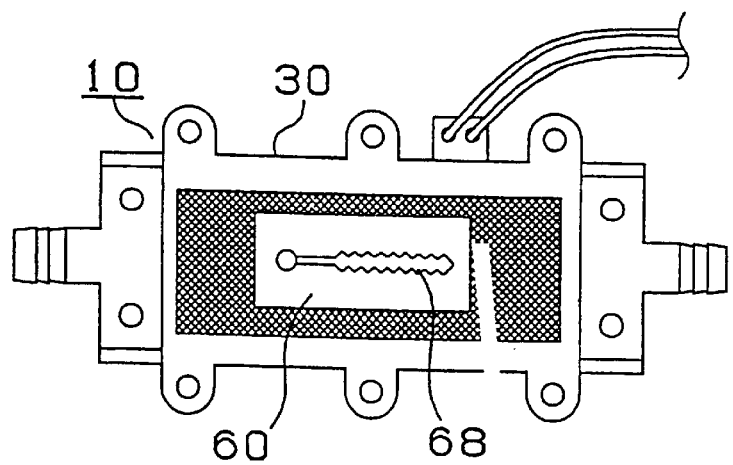
FIG. 3E is a bottom view of the ozonizer of FIG. 3A.
Figures 3F, 3G:
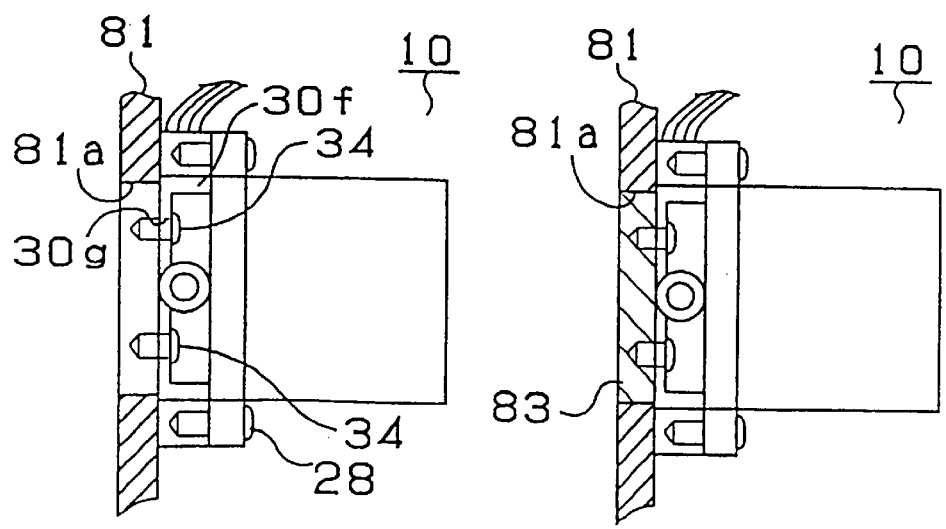
FIGS. 3F and 3G show the ozonizer of FIG. 3A mounted on the circulating water purifier of FIG. 1.

Next, the structure of the ozonizer 10 shown in FIG. 1 is described below with reference to FIGS. 3A–3G. FIG. 3A shows a front view of the ozonizer 10; FIG. 3B shows a side view of the ozonizer 10; and FIG. 3C shows the ozonizer 10 with a cover 30 separated therefrom. FIG. 3D shows a sectional view along line 3D—3D of FIG. 3A; FIG. 3E shows a bottom view of the ozonizer 10; FIGS. 3F and 3G show the ozonizer 10 mounted on the circulating water purifier 80.

As shown in FIG. 3C, the ozonizer 10 includes the ozonizing element 60, a box-like housing 20 which accommodates a high-voltage generating board 50, described below, for driving the ozonizing element 60, and a cover 30 for hermetically closing a first opening 20a formed in the housing 20. In the present embodiment, the housing 20 comprises a rectangular box-shape, but may assume various kinds of shapes such as a cylindrical shape.

The housing 20 is integrally formed from a material resistant to ozone-induced oxidation such as vinyl chloride, stainless steel, Teflon, or the like. A flange portion 20b having a second opening 20c formed therein is provided inside the housing 20. The ozonizing element 60 is mounted on the flange portion 20b via a packing 24 formed from an ozone-resistant fluorine-containing rubber. The packing 24 prevents ozone generated by the ozonizer 10 from leaking into the high-voltage generating board 50 side through the second opening 20c. A through-hole 20d is provided in a side wall of the housing 20. A screwdriver can be inserted through the through-hole 20d to adjust a variable resistor, described below, provided on the high-voltage generating board 50. On the bottom portion of the housing 20 are formed a socket flange 20f for accommodating sockets 22a and 22b and six screw flanges 20e through which corresponding screws 28 (see FIG. 3B) are inserted in order to fix the cover 30 on the housing 20. As shown in FIG. 3D, the sockets 22a and 22b are connected to the high-voltage generating board 50 via lead wires 56a and 56b.

The cover 30 is formed from a transparent vinyl chloride which is resistant to ozone. Here, the term "transparent" means a degree of transparency such that a user can determine whether or not there is a discharge at the inner ozonizing element 60, and thus includes semitransparent materials. Therefore, in order to achieve the above objects of the present invention, the cover 30 is preferably located so as to face the filamentary electrode 68 side of the creeping discharge element (creeping discharge type ozonization element) 60, namely, the side of the creeping discharge element 60 where corona discharge occurs. As shown in FIG. 3C, an upright wall 30a is formed on the cover 30. The upright wall 30a is inserted into the first opening 20a of the housing 20 and abuts the flange portion 20b via the packing 24 to thereby prevent ozone from leaking out of the apparatus.

An air intake pipe 30b for taking in air and an ozone discharge pipe 30c for discharging ozone are provided on the cover 30. The first air intake pipe 12a shown in FIG. 1 is connected to the air intake pipe 30b, whereas a discharge pipe 14 shown in FIG. 1 is connected to the ozone discharge pipe 30c. On the periphery of the cover 30, six screw flanges 30d are provided into which the corresponding screws 28 are driven in order to fix the cover 30 on the housing 20 (see FIG. 3B), and a terminal flange 30e is provided which supports terminals 32a and 32b for inserting into the sockets 22a and 22b, respectively. In the terminal flange 30e, external lead wires 54a and 54b are connected to the terminals 32a and 32b, respectively.

Also, as shown in FIGS. 3B and 3C, a pair of mounting brackets 30f extend longitudinally outward from both ends of the cover 30. As shown in FIG. 3F, the ozonizer 10 is fixedly mounted on the housing 81 of the circulating water purifier 80 by means of screws 34 which are inserted through the through-holes 30g formed in the mounting brackets 30f.

As shown in FIG. 3E, the ozonizing element 60 can be visually observed because the cover 30 is transparent. As shown in FIG. 3F, the ozonizer 10 is mounted on a window 81a formed in the housing 81 of the circulating water purifier 80. Accordingly, the discharge state of the ozonizer 10 can be monitored from outside the circulating water purifier 80. In FIG. 3F, the window 81a is formed in the housing 31 in the form of an opening. However, as shown in FIG. 3G, a glass plate 83 may be fit into the window 81a.

As described above, the ozonizer 10 allows a user to monitor the discharge state of the ozonizing element 60 from outside the circulating water purifier 80. When the discharge is properly carried out, a purple corona discharge light shines around the filamentary discharge electrode 68 of the ozonizing element 60 shown in FIG. 3E. The corona discharge light indicates that ozone is being generated.

In contrast, when the discharge is disabled due to accumulation of an ammonium salt on the ozonizing element 60 over long-term use, the above-described discharge light is not observed. In that case, the screws 28 (see FIG. 3F) are removed to thereby separate the cover 30 from the housing 20 as shown in FIG. 3C. Then, the ozonizing element 60 equipped in the housing 20 is cleaned using water or a solvent, to thereby remove the accumulated ammonium salt. This restores the ozonizing element 60 which can once again generate ozone. When the cover 30 is separated from the housing 20, the terminals 32a and 32b are disconnected from the sockets 22a and 22b, respectively, whereby the power supply is shut off. Thus, voltage applied to the ozonizing element 60 is reliably turned off. In yet another embodiment, a push-button switch (on when depressed) connected in series with the power supply may be employed. In this embodiment, the push-button switch is mounted such that the cover 30 depresses and engages the switch when fixed to the housing 20. When the cover 30 is removed, the circuit is broken such that the voltage applied to the ozonizing element 60 is reliably turned off. This enables a user to safely carry out the above-described cleaning work.

The circuit of the high-voltage generating board 50 is described below with reference to FIGS. 4A–4C. As shown in FIG. 4A, the high-voltage generating board 50 has an IC1 which receives an external electric potential of 12 V sequentially via the lead wires 54a and 54b, the terminals 32a and 32b, the sockets 22a and 22b, and the lead wires 56a and 56b (see FIG. 3D) and which provides a regulated voltage supply. The heater H for heating the ozonizing element 60 is connected to the IC1. Being located on the back surface side of the ozonizing element 60, the heater H continues heating the ozonizing element 60 to a temperature of approximately 40° C. even when power to the ozonizing element 60 is shut off, to thereby prevent dew condensation on the ozonizing element 60. In FIG. 4B, the oscillation of transistor TR1 can be stopped by applying a voltage from a terminal 69. This discontinues ozone generation while power is continuously supplied to the heater H.

As shown in FIG. 4B, the high-voltage generating board 50 includes a transformer T, the transistor TR1, a transistor TR2, an IC2 and a variable resistor RV. The transistor TR1 together with the transformer T oscillate to generate a high electric potential of 5 kV at 40 kHz. The thus-generated high electric potential of 5 kV is applied to the ozonizing element 60. The transistor TR2 is adapted to cause the transistor TR1 to start or stop oscillating. The IC2 is used to adjust the amount of ozone that is generated by the ozonizing element 60 by altering its duty ratio. In order to adjust the value of the variable resistor RV to thereby set the duty ratio of the IC2, a user may insert a screwdriver through the through-hole 20d formed in the housing 20 as shown in FIG. 3A. The high-voltage generating board 50 can include a power source such as a battery.

Next, an ozonizer 110 according to a second embodiment of the present invention is described below with reference to FIGS. 5A–5E. As in the case of the first embodiment, the ozonizer 110 is also intended for a circulating water purifier for use in a 24-hour working bath. A circulating water purifier employing the ozonizer 110 is similar to that of the first embodiment described above. Thus, a description thereof is not repeated. Members of the ozonizer 110 similar to those of the ozonizer 10 are denoted by common reference numerals, and the description thereof is not repeated.

Figure 5A:
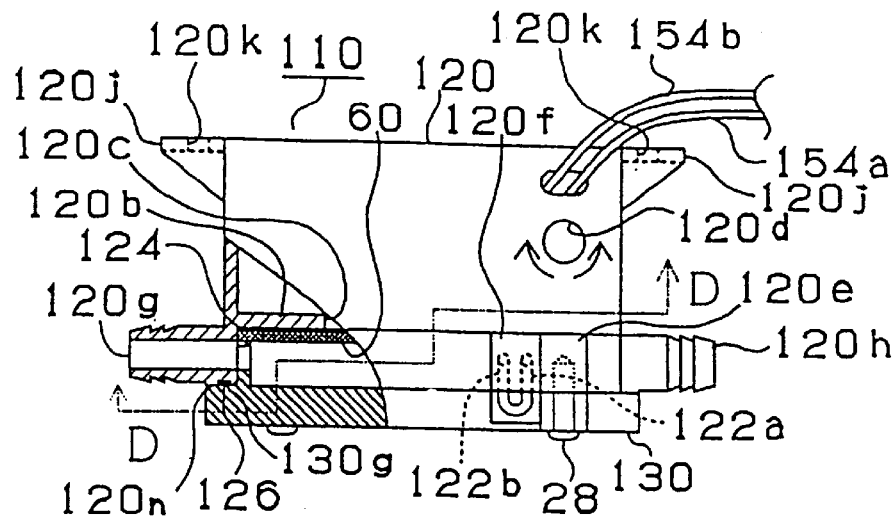
FIG. 5A is a front view of the ozonizer according to the second to embodiment.
Figure 5B:
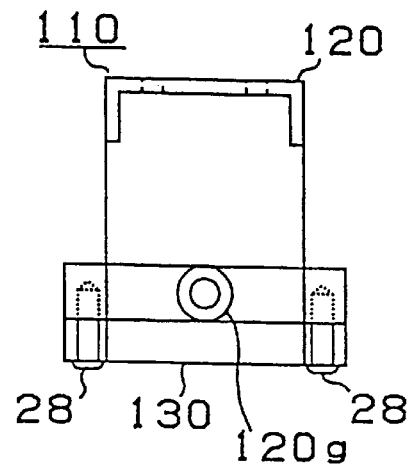
FIG. 5B is a side view of the ozonizer of FIG. 5A.
Figure 5C:
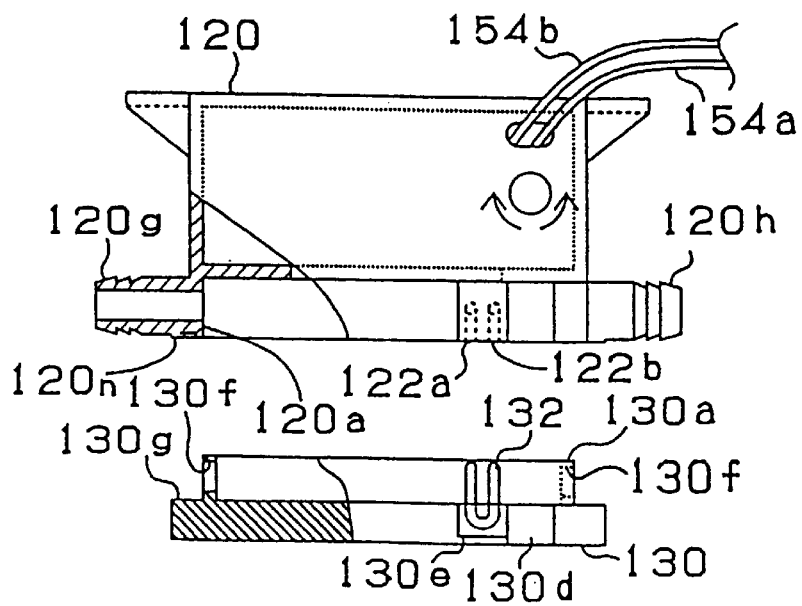
FIG. 5C is a view showing the ozonizer of FIG. 5A with its cover separated therefrom.
Figure 5D:
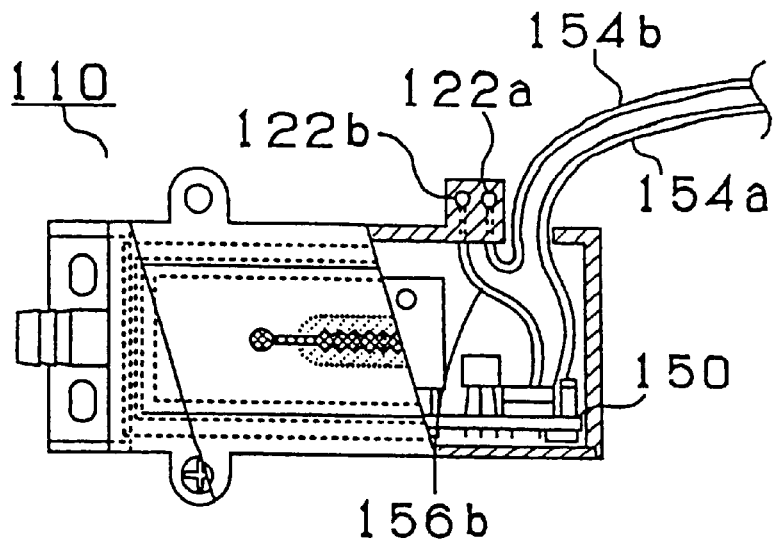
FIG. 5D is a sectional view along line 5D—5D of FIG. 5A.
Figure 5E:
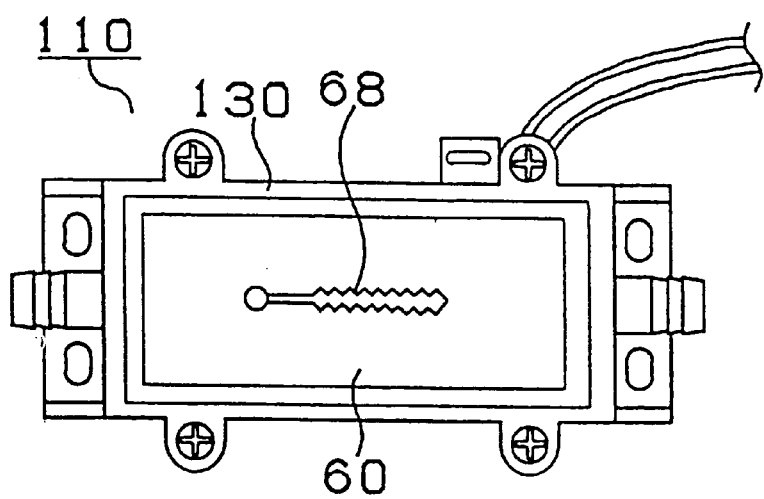
FIG. 5E is a bottom view of the ozonizer of FIG. 5A.

FIG. 5A shows a front view of the ozonizer 110; FIG. 5B shows a side view of the ozonizer 110; and FIG. 5C shows the ozonizer 110 with a cover 130 separated therefrom. FIG. 5D shows a sectional view along line 5D—5D of FIG. 5A, and FIG. 5E is a bottom view of the ozonizer 110.

As shown in FIG. 5C, the ozonizer 110 includes the ozonizing element 60 which has been described above with reference to FIGS. 2A–2C, a box-like housing 120 which accommodates a high-voltage generating board 150 (FIG. 5D), and a cover 130 for hermetically closing a first opening 120a of the housing 120.

The housing 120 is integrally formed from vinyl chloride. A flange portion 120b having a second opening 120c formed therein (see FIG. 5A) is provided inside the housing 120. The ozonizing element 60 is mounted on the flange portion 120b via a packing 124 formed from ozone-resistant fluorine-containing rubber. On the bottom portion of the housing 120 are provided a socket flange 120f for accommodating sockets 122a and 122b and six screw flanges 120e through which corresponding screws 28 are inserted in order to fix the cover 130 on the housing 120. A through-hole 120d is provided in a side wall of the housing 120 to allow for adjusting the variable resistor of the high-voltage generating board 150. As shown in FIG. 5D, the socket 122a is connected to a lead wire 154b, and the socket 122b is connected to the high-voltage generating board 150 via a lead wire 156b. Furthermore, an external lead wire 154a is directly connected to the high-voltage generating board 150.

In contrast to the ozonizer 10 of the first embodiment which has been described above with reference to FIGS. 3A–3G, in the ozonizer 110 of the second embodiment, an air intake pipe 120h and an ozone discharge pipe 120g are provided on the housing 120. The air intake pipe 12a shown in FIG. 1 is connected to the air intake pipe 120h, and the discharge pipe 14 shown in FIG. 1 is connected to the ozone discharge pipe 120g. Furthermore, a pair of mounting brackets 120j extend longitudinally outward from both ends of the top portion of the housing 120. After the ozonizer 110 is turned upside down from the state shown in FIG. 5A, the ozonizer 110 is fixedly mounted on the housing 81 of the circulating water purifier 80 by means of screws (not shown) which are inserted through through-holes 120k formed in the mounting brackets 120j.

The cover 130 is formed from a transparent vinyl chloride which is resistant to ozone. As shown in FIG. 5C, an upright wall 130a is formed on the cover 130. The upright wall 130a is inserted into the first opening 120a of the housing 120 and abuts the flange portion 120b via the packing 124 to thereby prevent ozone from leaking out of the apparatus as shown in FIG. 5A. Through-holes 130f are formed in the upright wall 130a so as to communicate with the air intake pipe 120h and the ozone discharge pipe 120g provided on the housing 120. A flange 130g extends outward from the cover 130 and abuts the bottom surface 120n of the housing 120 as shown in FIG. 5A. A packing 126 interposed between the flange 130g and the bottom surface 120n maintains a hermetic seal. That is, in the second embodiment, an ozone leak is prevented by using the packings 124 and 126.

On the periphery of the cover 130 are provided six screw flanges 130d through which the corresponding screws 28 (see FIG. 5A) are inserted in order to fix the cover 130 on the housing 120, and a terminal flange 130e which supports a U-shaped jumper 132 for inserting into the sockets 122a and 122b. Via the jumper 132, the external lead wire 154b and the lead wire 156b connected to the high-voltage generating board 150 are connected as described above with reference to FIG. 5D.

The circuit of the high-voltage generating board 50 in the second embodiment is described below with reference to FIGS. 4A–4C.

As shown in FIG. 4C, the high-voltage generating board 50 has the voltage regulating IC1 which receives an external electric potential of 12 V sequentially via the lead wire 154b, the jumper 132 and the lead wire 156b, and via the lead wire 154a. The circuit diagram of the high-voltage generating section of the high-voltage generating board 150 shown in FIG. 4B is similar to that of the first embodiment, and thus a description thereof is not repeated.

As shown in FIG. 5E, the ozonizing element 60 can be visually observed because the cover 130 is transparent. When ozone is not properly generated due to accumulation of ammonium salt on the ozonizing element 60, the cover 130 is removed and the ozonizing element 60 is cleaned. When the cover 130 is removed, the jumper 132 is disconnected from the sockets 122a and 122b as shown in FIG. 5D. As a result, the lead wire 154b is disconnected from the lead wire 156b such the electric potential is no longer applied to the ozonizing element 60. Accordingly, it is then safe to clean the ozonizing element 60.

Also, in the ozonizer 110, an air intake pipe 120h and an ozone discharge pipe 120g are provided on the housing 120. Accordingly, when the cover 130 is removed, the ozone discharge pipe 120g to which the discharge pipe 14 (see FIG. 1) is connected remains stationary. This prevents the discharge pipe 14 from accidentally being disconnected from the ozone discharge pipe 120g with a resultant ozone leak. Thus, safety is assured.

Figure 6:
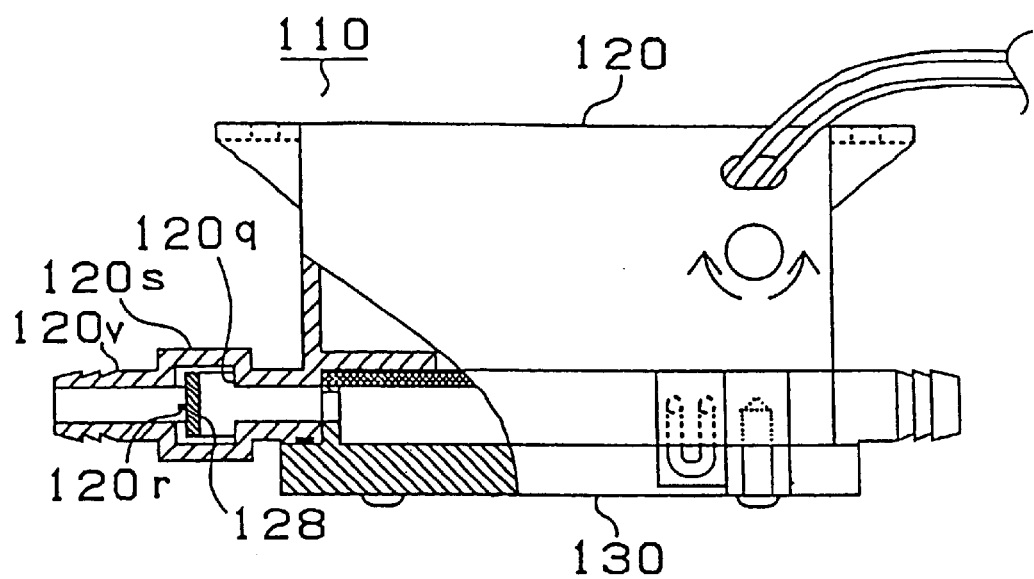
FIG. 6 is a front view of an ozonizer according to a modification of the second embodiment.
Figure 8A:
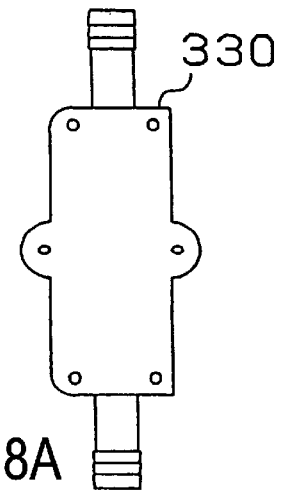
FIG. 8A is a plan view of a cover for mounting on a conventional ozonizer.
Figure 8B:
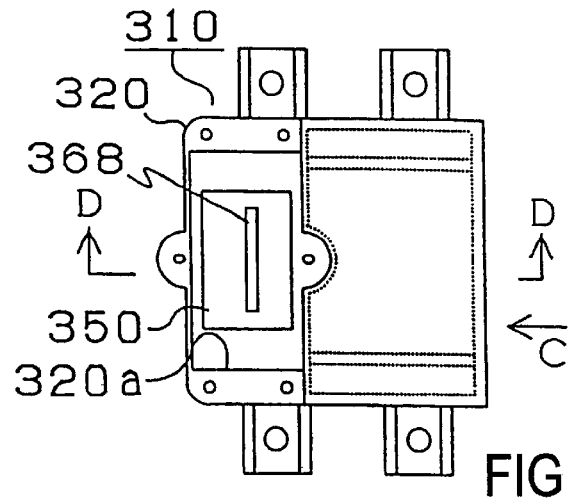
FIG. 8B is a plan view of a conventional ozonizer.
Figure 8C:
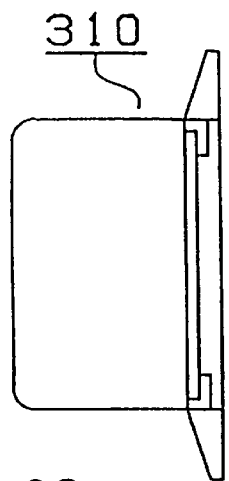
FIG. 8C is a view of the ozonizer of FIG. 8B in the direction of arrow C of FIG. 8B.
Figure 8D:
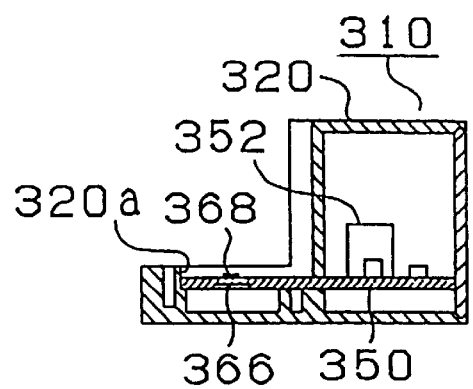
FIG. 8D is a sectional view along line 8D—8D of FIG. 8B.

Next, an ozonizer according to a modification of the second embodiment is described below with reference to FIG. 6.

In this modification, a check valve is unitarily provided in an ozone discharge pipe 120v. A slit 120r is formed in the interior of the cylindrical portion 120s of the ozone discharge pipe 120v, and a valve disk 128 moves along the slit 120r. When ozone flows back toward the ozonizer 110, the valve disk 128 abuts the inner wall 120q (a right-hand inner wall in FIG. 6) of the cylindrical portion 120s, to thereby prevent ozone from entering the ozonizer 110. This modification of the second embodiment does not involve installation of an external check valve, thereby avoiding an ozone leak which could otherwise occur at the connection between the check valve and a pipe used for connecting the check valve to the ozonizer 110.

Next, an ozonizer according to a third embodiment of the present invention is described below with reference to FIGS. 7A–7E.

An ozonizer 210 according to the third embodiment has a structure substantially similar to that of the second embodiment as described above with reference to FIGS. 5A–5E. In the second embodiment, the cover 130 is fixed onto the housing 120 with screws, whereas in the third embodiment, a cover 230 is removably attached to a housing 220 by means of hook-like engagement portions.

FIG. 7A shows a perspective view of the ozonizer 210 according to the third embodiment. FIG. 7B shows a side view of the cover 230. FIG. 7C shows a side view of the housing 220. FIG. 7D shows a sectional view along the line 7D—7D of FIG. 7A. As shown in FIG. 7B, the cover 230 has engagement portions 230b serving as the engagement means of the present invention. The engagement portion 230b includes a flexible support piece 230c extending sideward from the cover 230, a hook 230e formed at the tip end of the support piece 230c, and a projection 230d formed substantially at the center of the support piece 230c and projecting upward. Engagement hole portions 220b serving as the engagement means of the present invention are formed in the housing 220 so as to engage the engagement portions 230b of the cover 230. The engagement hole portion 220b includes a stepped engagement portion 220c for engaging the hook 230e and a through-hole 220d for receiving the projection 230d.

In the ozonizer 210, the cover 230 is press-fitted into the housing 220, whereby the hooks 230e of the engagement portions 230b of the cover 230 engage the stepped engagement portions 220c of the engagement hole portions 220b of the housing 220. Thus, the cover 230 is fixed on the housing 220. When the cover 230 is to be removed from the housing 220, the projections 230d of the engagement portions 230b are pressed down to thereby disengage the hooks 230e from the stepped engagement portions 220c of the engagement hole portions 220b. In FIG. 7B, 230a is a peripheral projecting portion for holding a packing inside and providing an air-tight seal.

In the third embodiment, the ozonizing element can be readily cleaned because the cover 230 is removably attached to the housing 220 without using screws. In FIGS. 7A–7E, a jumper used for shutting off power to the high-voltage generating board is omitted for convenience of illustration.

FIG. 7E shows an ozonizer 210 according to a modification of the third embodiment. In this modification, the housing 220 has an engagement portion 220e, and the cover 230 has an engagement hole 230f formed therein.

In the above-described first, second, and third embodiments, the entire cover 30, 130, or 230 is transparent. However, only a portion of the cover 30, 130 or 230 or housing need be transparent so long as the ozonizing element 60 is visible. The transparent part of the cover or housing is preferably made of an inorganic transparent material such as glass as opposed to a transparent plastic (organic) material. This is because the transparent plastic loses its transparency faster than glass over an extended period of use.

In the above-described embodiments, a low electric potential supplied to the high-voltage generating board is disconnected when the cover is removed. Alternatively, a high electric potential applied to the ozonizing element 60 is disconnected when the cover is removed. Also, in the above-described embodiments, the high-voltage generating board is accommodated within the housing. Alternatively, the ozonizing element 60 alone may be accommodated within the housing, and a high electric potential may be applied to the ozonizing element 60 from a high-voltage generating board disposed outside the housing.

Figure 9:
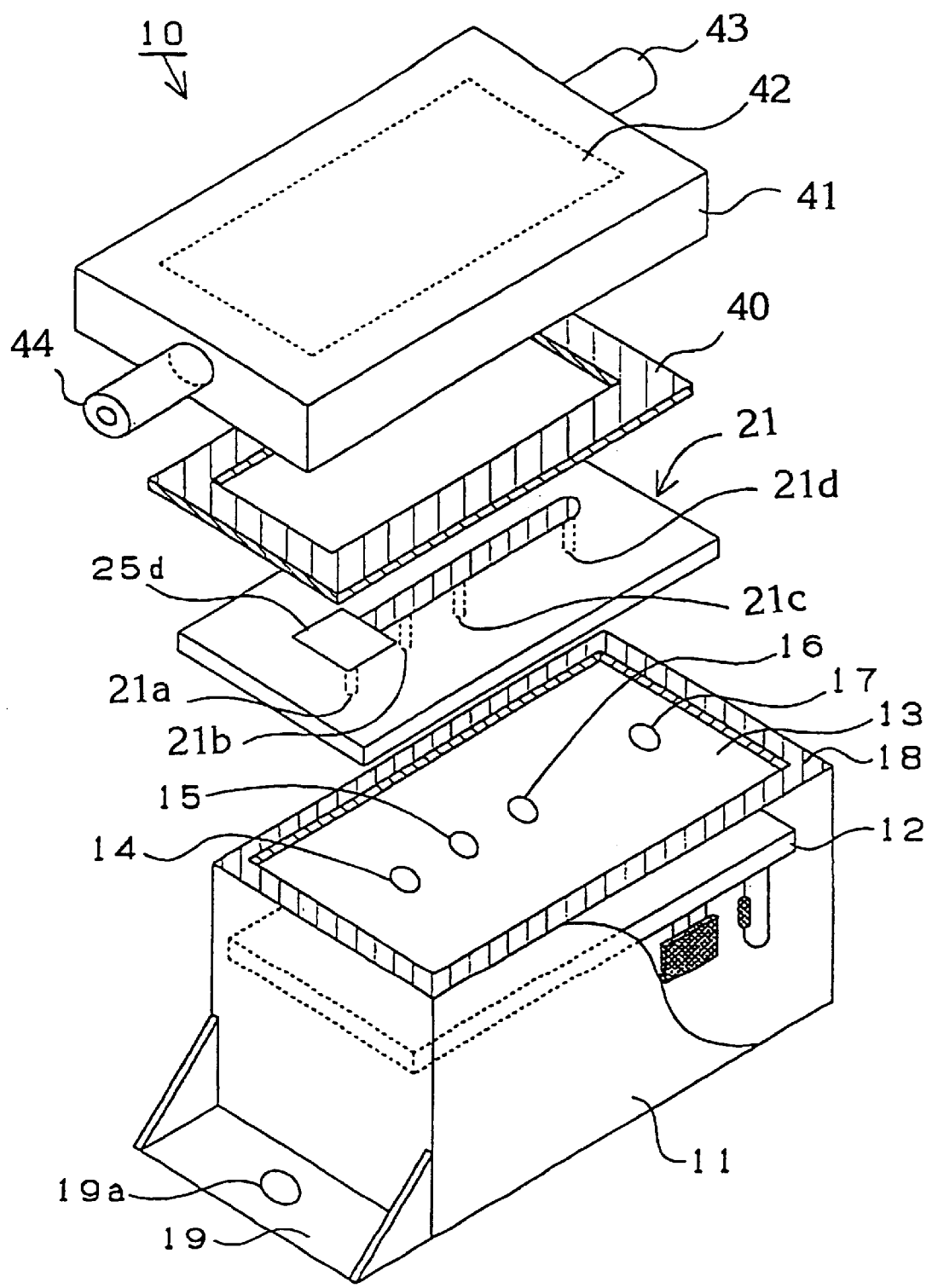
FIG. 9 is an exploded view of an ozonizer according to an embodiment of the present invention.

Next, the main structure of the ozonizer 10 in accordance with the fifth through seventh aspects of the present invention is described below with reference to FIG. 9.

Figure 11:
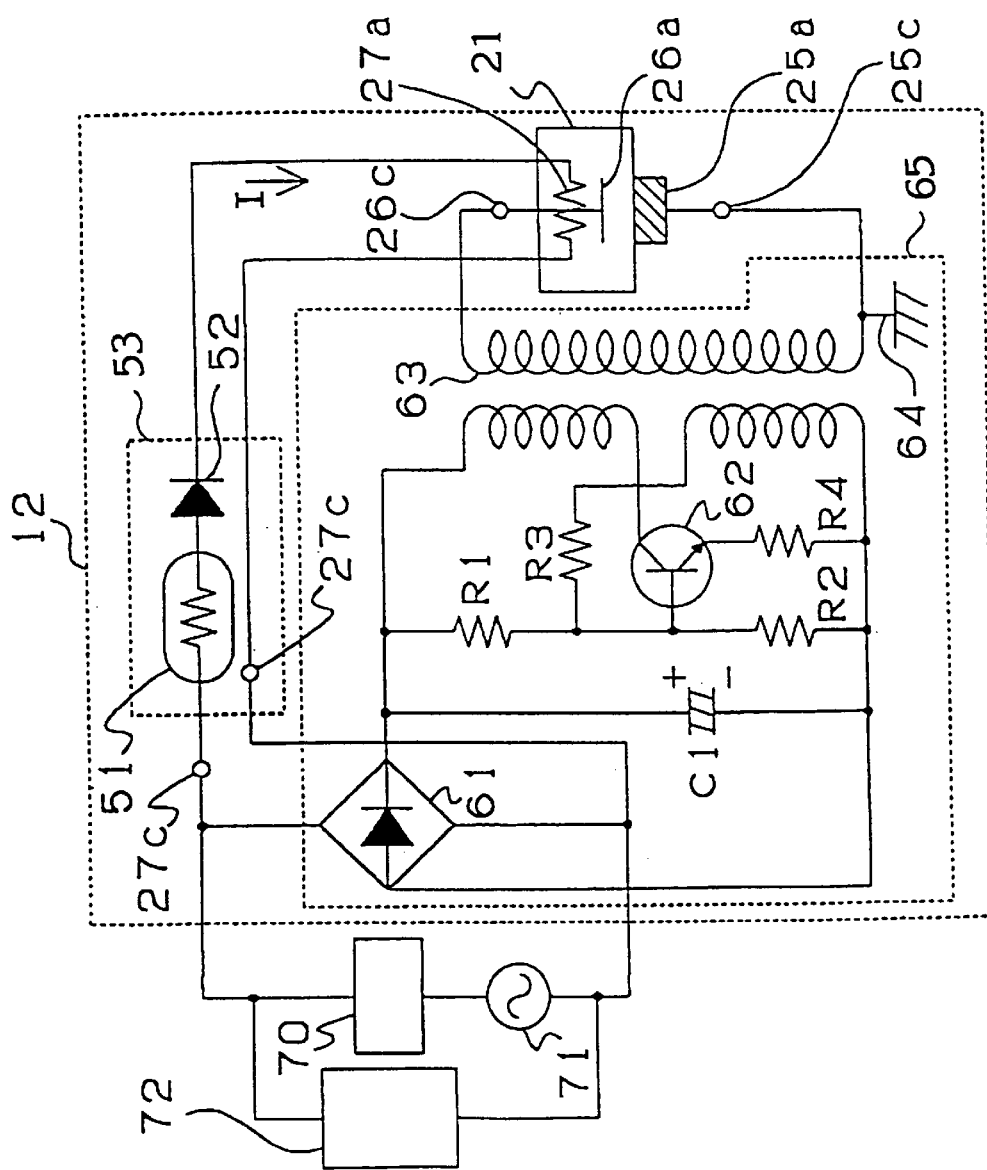
FIG. 11 is a circuit diagram of an electric circuit used in the ozonizer of FIG. 9.

The ozonizer 10 includes a box-shaped resin case 11, which houses a circuit board 12 on which an electric circuit shown in FIG. 11 is formed. A board 13 is mounted on the top portion of the case 11. The board 13 has four sockets 14, 15, 16, and 17, which are electrically connected to the electric circuit formed on the circuit board 12. A frame-shaped packing 18 formed from a heat resistant rubber is disposed on the peripheral edge of the top of the case 11. An ozone generating element 21 is fitted into the space surrounded by the packing 18. Four connection pins 21a, 21b, 21c, and 21d project from the back surface of the ozone generating element 21 and are inserted into the sockets 14 through 17, respectively.

A frame-shaped packing 40 formed from a heat resistant rubber is disposed on the peripheral edge of the upper surface of the ozone generating element 21 fitted into the packing 18. A cover 41 is placed on the upper surface of the case 11 with the packing 40 interposed therebetween.

That is, the ozone generating element 21 is not in direct contact with the case 11. This prevents heat generated from the ozone generating element 21 from being transmitted to the case 11 which might otherwise deteriorate or deform the case 11.

An opening 42 is formed in the lower surface of the cover 41. The air intake valve 43 for drawing in the air and the discharge pipe 44 for discharging ozone are provided on opposing end surfaces of the cover 41, respectively. The air intake pipe 43 and the discharge pipe 44 communicate with the opening 42. A mounting bracket 19 for mounting the ozonizer 10 inside the housing 81 of the water purifier 80 is provided at each end surface of the case 11 at a lower position thereof. A screw hole 19a is provided through the mounting bracket 19.

In this embodiment, a fluorine-containing rubber is used as the heat resistant rubber.

Next, the structure of the ozone generating element 21 is described below with reference to FIGS. 10A and 10B.

Figure 10A:
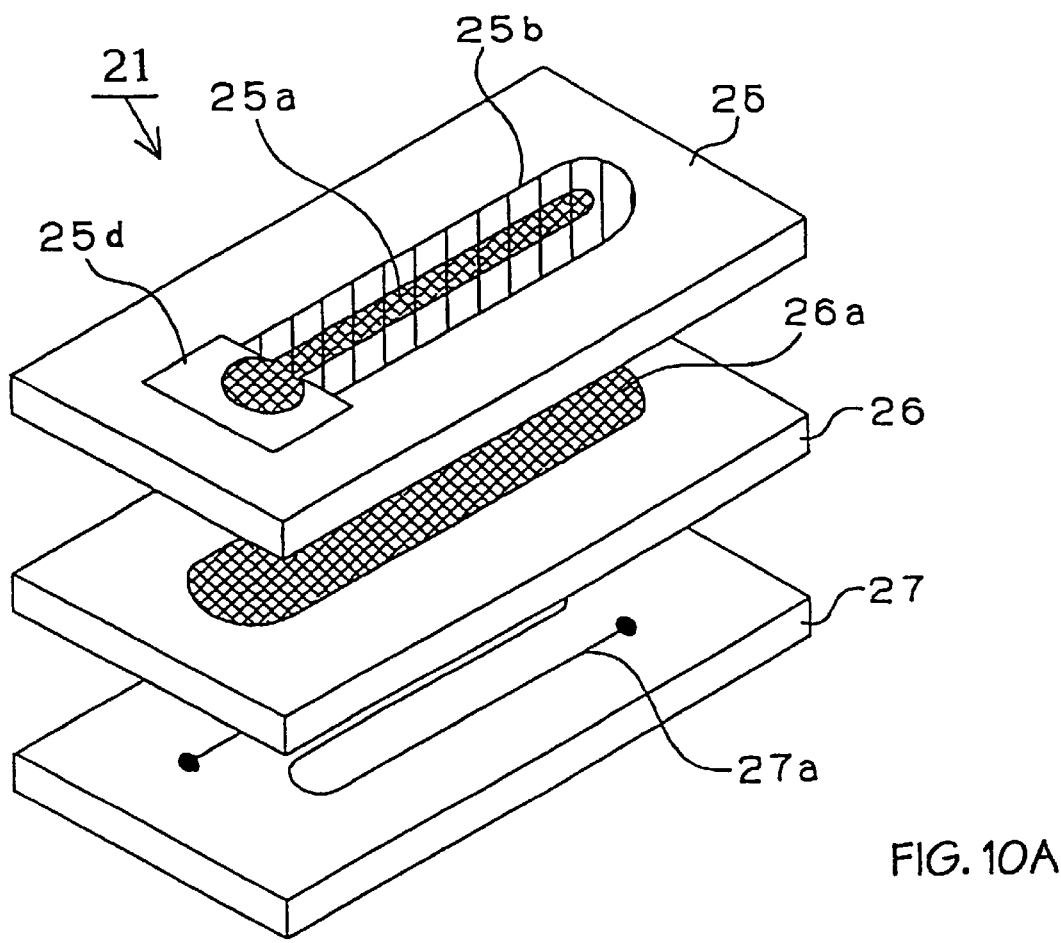
FIG. 10A is an exploded view of a discharge element employed in the ozonizer of FIG. 9.
Figure 10B:
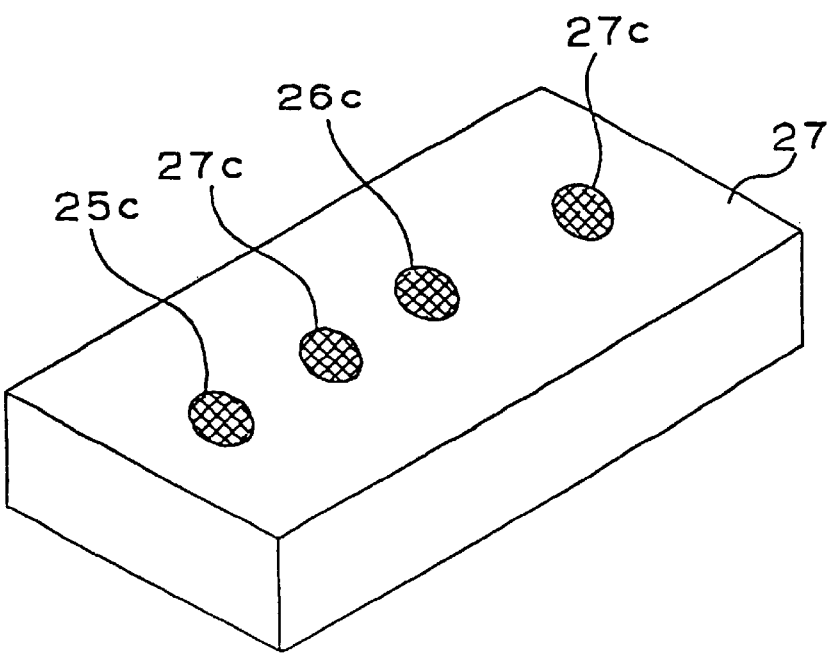
FIG. 10B is a perspective bottom view of the discharge element of FIG. 10A.

As shown in FIG. 10A, the ozone generating element 21 includes a discharge element 22, which in turn includes a sheet-like first dielectric layer 25 and second dielectric layer 26, and a third dielectric layer 27 in the form of a laminate. A filamentary discharge electrode 25a is provided on the surface of the first dielectric layer 25. Most of the surface of the filamentary discharge electrode 25a is covered with a protective film 25b to protect against wear caused by the discharge. A portion of the filamentary discharge electrode 25a that is not covered with the protective film 25b is exposed to the atmosphere and forms an exposed portion 25d.

Even if the ozone generating element 21 breaks with a resulting exposure of a surface of the induction electrode 26a or heater electrode 27a, current flows into the exposed portion 25d. Thus, a user is protected from electric shock.

The surface induction electrode 26a is provided on the front surface of the second dielectric layer 26 such that its position corresponds to that of the filamentary discharge electrode 25a. The heater electrode 27a serving as the heat generating element of the present invention is provided on the front surface of the third dielectric layer 27 such that its position corresponds to that of the filamentary discharge electrode 25a.

In this embodiment, the heater electrode 27a is preferably located within 5 mm from the filamentary discharge electrode 25a for better heating efficiency.

One end of the filamentary discharge electrode 25a is electrically connected to a terminal 25c formed on the back surface of the third dielectric layer 27. The terminal 25c is electrically connected to the ground side of the electric circuit via the connection pin 21a (see FIG. 9). One end of the surface induction electrode 26a is electrically connected to a terminal 26c. The terminal 26c is electrically connected to the high-voltage side of the electric circuit via the connection pin 21c. Both ends of the heater electrode 27a are connected to terminals 27c. The terminals 27c are electrically connected to a heat generating circuit formed in the electric circuit via the connection pins 21b and 21d.

In this embodiment, the filamentary discharge electrode 25a and the surface induction electrode 26a are preferably formed from tungsten, and the protective film 25b is preferably formed from glaze or a ceramic. A material for the heater electrode 27a is selected such that the temperature of the discharge element 22 reaches 200° C. to 500° C. approximately 10 seconds after power is applied to the discharge element 22 in the case of using a 110V AC power source.

This is because ammonium nitrate adhering to the discharge element 22 can be evaporated at a temperature of 200° C. to 500° C.

The discharge element 22 preferably reaches a temperature of from 250° C. to 350° C.

That is, ammonium nitrate adhering to the discharge element 22 begins to vaporize at a temperature slightly above 200° C. However, in order to reduce evaporation time, the discharge element 22 is preferably heated to a temperature of at least 250° C. Also, if the discharge element 22 is heated to an excessively high temperature, the case 11 may deteriorate or deform.

Thus, in view of the above, the heater electrode 27a having a resistance of 50Ω at room temperature and a power consumption of 50 W is preferably formed from a mixed material of tungsten and ceramic so that the temperature of the discharge element 22 reaches 250° C. to 350° C. in 10 seconds.

Next, the electric circuit formed on the circuit board 12 is described with reference to FIG. 11.

A heat generating circuit 53 and a power circuit 65 are provided on the circuit board 12. The heat generating circuit 53 supplies current to the heater electrode 27a so as to generate heat from the heater electrode 27a. The power circuit 65 supplies power to the ozone generating element 21 and the heat generating circuit 53.

The heat generating circuit 53 includes a thermistor 51 having a positive characteristic and a diode 52. The thermistor 51 is connected in series with the heater electrode 27a and functions as the heat generating time control means of the present invention. The diode 52 is connected in series between the thermistor 51 and the heater electrode 27a. The power circuit 64 includes a half-wave diode bridge 61, a transistor 62, and a transformer 63. The diode bridge 61 rectifies alternating current supplied from an AC power source 71. The thus half-wave rectified current causes the transistor 62 to perform a switching operation. Switching of the transistor 62 causes the transformer 63 to apply a voltage between the filamentary discharge electrode 25a and the surface induction electrode 26a.

Also, the filamentary discharge electrode 25a of the ozone generating element 21 is connected to a ground wire 64.

Accordingly, even when water enters the case 11 and wets the filamentary discharge electrode 25a, there is no potential difference between the filamentary discharge electrode 25a and the water. Thus, a user does not suffer from electric shock.

Next, the operation of the water purifier 80 and ozonizer 10 is described below.

In this embodiment, the voltage applied between both electrodes is 5 kV at 40 kHz. The resistance of the thermistor 51 is 15Ω at room temperature. The maximum voltage of the AC power source 71 is approximately 140 V.

When the timer 70 turns ON at a predetermined time, power from the AC power source 71 is supplied to a pump-driving circuit 72. As a result, the circulation pump 92 is driven to thereby pump hot water from the bathtub 98 through the water intake 82. Hot water is then filtered by the bucket 86 and heated by the heater 90. The thus-heated hot water is discharged from the jet nozzle 96. The first solenoid valve 16A is opened, and the second solenoid valve 16B is closed, such that air is drawn into the ozonizer 10 through the air intake pipe 12a.

When the timer 70 is turned ON, alternating current is supplied from the AC power source 71 to the circuit board 12. The thus-supplied alternating current undergoes half-wave rectification by the diode bridge 61. An electrolytic capacitor C1 is charged with the thus half-wave rectified current. When the electrolytic capacitor C1 is charged, base current flows to the base of the transistor 62 via a resistor R1; consequently, the transistor 62 turns ON. As a result, current flows to the secondary of the transformer 63, and an electric potential is established between the filamentary discharge electrode 25a and surface induction electrode 26a of the ozone generating element 21 sufficient to generate a discharge. The discharge converts oxygen contained in the air, which has been drawn into the opening 42 through the air intake pipe 12a (see FIG. 1), into ozone. The ozone thus generated is transferred through the discharge pipe 14 and discharged from the jet nozzle 96 into hot water contained in the bathtub 98 in the form of bubbles.

The above-described alternating current supplied from the AC power source 71 to the circuit board 12 also flows through the thermistor 51 and then to the diode 52. The diode 52 performs half-wave rectification on the alternating current to thereby produce a DC voltage of approximately 70 V. Thus, direct current flows through the heater electrode 27a to thereby heat the heater electrode 27a. The magnitude of current I flowing to the heater electrode 27a is approximately 1A (I=70 V/(15Ω+50Ω)≅1A). Accordingly, the power consumption P of the heater electrode 27a is approximately 50 W (P=1²×50).

Subsequently, as current flows continuously, the temperature of the discharge element 22 reaches 250° C. to 350° C. in approximately 10 seconds. This elevated temperature induces scattering of ammonium nitrate molecules adhering to the filamentary discharge electrode 25a. Meanwhile, the resistance of the thermistor 51 increases to 2.5 kΩ due to temperature rise, such that current stops flowing through the thermistor 51. Consequently, the heater electrode 27a stops generating heat.

In this embodiment, the timer 70 goes ON at 50-minute intervals and goes OFF 10 minutes after it goes ON. The ozone generating element 21 discharges continuously to generate ozone until the timer 70 goes OFF.

As described above, according to this embodiment, the ozone generating element 21 is heated by the heater electrode 27a to thereby induce scattering of ammonium nitrate molecules adhering to the filamentary discharge electrode 25a. This, in turn, removes the adhering ammonium nitrate.

Accordingly, this aspect of the present invention dispenses with the need for conventional manual maintenance which involved disassembling an ozonizer and wiping the discharge element using water or a solvent.

Furthermore, because measures for preventing electric shock are employed, maintenance can be readily performed.

Particularly, when an ozonizer used in a water purifier is maintained, there is a high possibility of electric shock due to the entry of water. However, the ozonizer of the present invention provides an electric shock-free environment.

The ozonizer of the present invention can be used in various ozonized water-producing apparatuses without particular limitation. Namely, the water purifier of the present invention is applicable to water purification systems for ponds, water tanks, pools and the like.

It should further be apparent to those skilled in the art that various changes in form and detail of the invention as shown and described above may be made. It is intended that such changes be included within the spirit and scope of the claims appended hereto.

What is claimed is:

1. An ozonizer comprising:

a discharge element for generating ozone by discharge in air containing ammonia, wherein said discharge produces nitrogen oxides which react with ammonia present in the air to produce ammonium nitrate adhering to said discharge element; and a heat generating element for heating said discharge element to a predetermined temperature within a range of from 200° C. to 500° C. which induces scattering of ammonium nitrate molecules adhering to said discharge element.

2. The ozonizer according to claim 1, further comprising a heat generating circuit for supplying current to said heat generating element so as to heat the heat generating element to said predetermined temperature.

3. The ozonizer according to claim 2, further comprising heat generating time control means for controlling a period of time during which said heat generating element generates heat.

4. The ozonizer according to claim 3, wherein said heat generating time control means comprises a thermistor having a positive characteristic connected in series with said heat generating element.

5. The ozonizer according to claim 2, further comprising a timer for controlling a period of time during which current is supplied to said discharge element and said heat generating circuit.

6. The ozonizer according to claim 1, wherein said predetermined temperature is set within a range or from 250° C. to 350° C.

7. The ozonizer according to claim 1, wherein said discharge element comprises a dielectric formed from ceramic, a discharge electrode disposed on a first surface of said dielectric, and an induction electrode disposed in said dielectric opposite to and separate from said discharge electrode; and said heat generating element is disposed on a surface of said dielectric opposite said induction electrode.

8. The ozonizer according to claim 7, wherein said discharge element is housed in a resin case;

said induction electrode is connected to a high-voltage supply;

said discharge electrode is connected to ground; and a portion of said discharge electrode is covered with a protective film against wear caused by discharge and another portion of said discharge electrode is exposed from the first surface of said dielectric.

9. The ozonizer according to claim 8, further comprising a heat resistant rubber interposed between the discharge element and the case.

10. A water purifier comprising:

the ozonizer according to claim 7;

a filter for filtering water; and ozone discharging means for discharging ozone generated by said ozonizer into water filtered through said filter.

11. A water purifier comprising:

the ozonizer according to claim 1;

a filter for filtering water; and ozone discharging means for discharging ozone generated by said ozonizer into water filtered through said filter.

12. A method of cleaning an ozonizer having a discharge element for generating ozone by discharge in air containing ammonia, wherein said discharge produces nitrogen oxides which react with ammonia present in the air to produce ammonium nitrate adhering to said discharge element, which comprises heating said discharge element to a predetermined temperature within a range of from 200° C. to 500° C. so as to evaporate ammonium nitrate adhering to said discharge element.

13. The cleaning method according to claim 12, which comprises heating said discharge element to a temperature within a range of from 250° C. to 350° C.

* * * * *